United States Patent
Valk et al.

(10) Patent No.: US 8,932,448 B2
(45) Date of Patent: Jan. 13, 2015

(54) MEMBRANE, CELL, DEVICE AND METHOD FOR (REVERSE) ELECTRODIALYSIS

(75) Inventors: Jan Valk, Cornjum (NL); Jan Willem Post, Hoevelaken (NL)

(73) Assignee: Redstack B.V., Sneek (NL)

( * ) Notice: Subject to any disclaimer, the term of this patent is extended or adjusted under 35 U.S.C. 154(b) by 704 days.

(21) Appl. No.: 12/921,358

(22) PCT Filed: Mar. 16, 2009

(86) PCT No.: PCT/NL2009/000062
§ 371 (c)(1),
(2), (4) Date: Dec. 20, 2010

(87) PCT Pub. No.: WO2009/116855
PCT Pub. Date: Sep. 24, 2009

(65) Prior Publication Data
US 2011/0086291 A1    Apr. 14, 2011

(30) Foreign Application Priority Data
Mar. 18, 2008  (NL) ..................... 1035190

(51) Int. Cl.
H01M 8/22       (2006.01)
B01D 69/06      (2006.01)
B01D 61/50      (2006.01)
H01M 8/08       (2006.01)

(52) U.S. Cl.
CPC .............. *H01M 8/227* (2013.01); *B01D 61/50* (2013.01); *B01D 69/06* (2013.01); *B01D 2313/14* (2013.01); *B01D 2313/30* (2013.01); *Y02E 60/50* (2013.01)

USPC ........... 204/634; 429/454; 429/457; 429/498; 429/499

(58) Field of Classification Search
CPC ....................................................... H01M 8/22
USPC .......... 204/523, 633, 634, 635; 429/498, 499, 429/500, 501, 516, 105, 454, 457
See application file for complete search history.

(56) References Cited

U.S. PATENT DOCUMENTS 3,025,227 A  *  3/1962  Kollsman ...................... 204/520
RE25,265 E  *  10/1962  Kollsman ...................... 204/523

(Continued)

FOREIGN PATENT DOCUMENTS

EP           0078659       5/1983
RU           2262965       10/2005

(Continued)

OTHER PUBLICATIONS

Lebed et al. "Electrodialyzer [Elektrodializator]"—English Translation of SU 874090 A1. Published Oct. 23, 1981. Translation completed Feb. 2014 by FLS, Inc.*

*Primary Examiner* — Keith Hendricks
*Assistant Examiner* — Steven A. Friday
(74) *Attorney, Agent, or Firm* — Daniel G. Stoddard; Bret E. Field; Bozicevic, Field & Francis LLP

(57) ABSTRACT

Membrane, cell and device suitable for reverse electrodialysis for the purpose of generating electricity, and methods therefor, the membrane comprising a number of channels arranged on at least a first side of the membrane, wherein the channels are suitable for throughfeed of a fluid, wherein the dimensions of the channels are aimed at obtaining a laminar flow of the fluid in the channels.

14 Claims, 3 Drawing Sheets

(56) References Cited

U.S. PATENT DOCUMENTS

2004/0060823 A1 4/2004 Carson et al.
2004/0178075 A1* 9/2004 Sato .............................. 204/632
2007/0023290 A1 2/2007 Hawkins et al.

FOREIGN PATENT DOCUMENTS

| SU | 874090 A1 | * | 10/1981 |
| WO | WO 2005009596 A1 | * | 2/2005 |
| WO | WO 2006066345 A1 | * | 6/2006 |

* cited by examiner

MEMBRANE, CELL, DEVICE AND METHOD FOR (REVERSE) ELECTRODIALYSIS

The present invention relates to a membrane suitable for (reverse) electrodialysis. Such membranes can for instance be used for generating energy from the mixing of salt and fresh water, for instance in delta regions where fresh river water flows out into the sea and in the case of industrial salt-water flows which are mixed or discharged.

Electrodialysis is a process applied for instance in the production of drinking water from salt water or brackish water. A voltage is here applied between an anode and a cathode, between which a number of anion and cation exchange membranes are alternately placed. Owing to the applied voltage positive ions tend to move toward the cathode and negative ions tend to move toward the anode. As a result of the arranged membranes this results in alternately concentrated and diluted electrolyte solutions. Such an electrodialysis process can be reversed in order to generate electric energy. This is reverse electrodialysis. A device for performing such a reverse electrodialysis process is for instance described in NL 1031148. Known membranes are aimed at electrodialysis. In the reverse electrodialysis process this results in too high an electrical resistance and is usually too costly due to the choice of the basic materials used and the use of, among others, woven materials to strengthen the membranes. The known devices thereby have a relatively low efficiency when operating a reverse electrodialysis process.

The present invention has for its object to provide a device for generating electricity, wherein the applied reverse electrodialysis process can be operated in a more efficient manner.

This object is achieved with the membrane according to the invention for use in an electrodialysis, and in particular in a reverse electrodialysis, process, comprising a membrane for use in a reverse electrodialysis process comprising a number of channels arranged on at least a first side of the membrane, wherein the channels are suitable for throughfeed of a fluid, and wherein the channels are provided with dimensions such that a substantially laminar flow of the fluid results in the channels.

By providing channels in at least one side of the membrane the flow of the fluid can be better controlled. This is the result of the fluid not being sent through an open space but being guided through the channels of the membrane. A type of profiled membrane is obtained by providing these channels in the membrane itself. It is hereby possible to limit the distance between adjacent membranes to less than 1 mm, and preferably to a distance of 0.2 mm or even less. The importance of this small mutual distance when compared to the considerably greater distance used in known membranes lies in, among other factors, the reduction of the internal electrical resistance in the fluid. It has been found that in the case of reverse electrodialysis the internal electrical resistance is relatively high as a result of the low ion concentrations in the fresh water. While applications for an electrodialysis process are aimed at creating turbulent flows in order to thereby increase the limiting flow strength, it is according to the invention precisely this which is undesirable in the case of reverse electrodialysis. Owing to the use of channels in which the flow of the fluid can be better controlled the dimensions and conditions of the channels and the flow can be chosen such that a laminar flow is realized in the channels. The internal hydraulic or flow resistances are hereby reduced. In addition, such a laminar flow results in smaller friction losses. A lower pump power is hereby required to perform the reverse electrodialysis process provided with the profiled membranes.

In known devices for performing an electrodialysis process, as well as for performing reverse electrodialysis, use is made of screen spacers between the membranes. These separate spacers increase the turbulence of the flow between adjacent membranes. Such spacers also impede the flow. This results in a greater flow resistance. A greater pump power is hereby required to operate the process, resulting in a lower efficiency of electricity generation. In addition, such spacers increase the internal electrical resistance since they can be seen as a kind of insulator. A part of the current-carrying surface here becomes non-conductive or is shielded as a result of applying the spacer. This effect is also referred to as the shadow effect of the spacers. This results in a less efficient process. The spacers are also susceptible to contamination and the accumulation of particles. Specific requirements are therefore laid down for such spacers and more frequent cleaning is necessary during use. Such stricter requirements result in a large investment in the production of the device with the membranes. The additional cleaning steps during use increase production costs and reduce efficiency due to the decrease in operating time of the process. Because the spacers are required in known devices in order to allow flow between adjacent membranes, the provision of channels in the surface of a membrane, according to the invention, results in a considerable improvement in the efficiency of the reverse electrodialysis process. In addition, the provision of channels in the membrane surface has an additional advantage compared to the current practice of using spacers in the fact that fewer separate components are required. This simplifies assembly and thereby also increases the efficiency of the reverse electrodialysis process. When a membrane according to the invention is used in a reverse electrodialysis process, the fluid flowing through the channels will comprise a fluid with a relatively high salt concentration or a fluid with a relatively low salt concentration. In an advantageous embodiment the membrane has a thickness of roughly 0.3 mm with channels therein of a depth of about 0.2 mm. The width of the channels preferably amounts here to about 1.0 mm. The intermediate walls between the separate channels of the membrane surface have a thickness of about 0.2 mm. These intermediate walls also serve as support for the membrane in relation to adjacent membranes.

In an advantageous embodiment according to the invention the channels are provided parallel to each other.

The flow resistances are limited as much as possible by providing the channels arranged on at least a first side of the membrane parallel to each other. These are, among others, the flow resistances resulting from the inflow of the fluid into the channels and the outflow of the fluid out of the channels. The channels are preferably oriented in length direction of the membrane. Bends or angles are preferably not provided in such channels. Nor preferably are these channels placed at an angle to a length direction of the membrane. The flow resistance of the fluid in the channel is decreased by the proposed configuration of the channels in the membrane. The laminar flow of the fluid in the channel is not hereby disrupted either, and turbulence which could increase the internal flow resistance will not occur. An additional advantage of the proposed configuration of the channels in a membrane is that such a configuration is simpler to realize and therefore makes the production of such membranes simpler.

In an advantageous preferred embodiment according to the present invention the membrane is provided with an inlet part for infeed of the fluid into the channels and an outlet part for discharge of the fluid from the channels, wherein at least the inlet part is provided with guide ribs.

In order to operate the reverse electrodialysis process in an efficient manner the distribution of the fluid over the channels must be carried out as optimally as possible. The frictional resistance to this flow must also remain as limited as possible for the purpose, among others, of limiting the pump power required for the process.

In order to keep the overall pressure drop limited to a fraction of the osmotic pressure difference between seawater and for instance river water, the pressure drop occurring during throughflow of the membranes must remain limited to 25-30 kPa. In order to obtain a good distribution of the liquid over the channels, the pressure drop at the fluid feed and fluid discharge must be less than the pressure drop over the channels, preferably lower than 5-10 kPa. At least the inlet part is preferably provided with guide ribs. These ribs also have a possible function as additional support for the membrane. Additional strength is hereby imparted to a device provided with a plurality of membranes. In addition, the flow of fluid is guided by these ribs from the feed to the channels. An optimum distribution of fluid over the channels in the membrane is hereby realized. The feed of the fluid to the inlet part is realized by manifolds created by passages made in the membrane. Such manifolds are already known per se from known devices for electrodialysis. In these known devices a passage is made in the gasket in the direction of a spacer for passage of the fluid from the manifolds to the space between the membranes. Through the use of the channels, whereby spacers are no longer required, the feed of the liquid from the manifolds is also simplified. An additional advantage of the membrane according to the invention is that fewer elements are involved in the sealing of the membranes relative to the environment. In known devices the membrane, the seal and the spacer should together realize the sealing at the position of the manifold. In the case of, among other possibilities, a non-uniform compression an external and/or internal leakage could occur. An additional advantage of the membrane according to the invention is that the membrane is hereby formed integrally with the seal. This reduces the chance of leakage. Among other things, this simplifies assembly of the elements. The chance of internal leakage is limited considerably by the long path length in the pressure surface between the salty and the less salty compartment in the advantageous assembly.

In a further advantageous preferred embodiment according to the present invention the membrane comprises a sulphochlorinated polyolefin material, preferably polyethylene, and most preferably low-density polyethylene.

Through the use of sulphochlorinated polyolefin material a membrane according to the invention can be manufactured from a relatively inexpensive basic material. This reduces installation costs for a device for applying a reverse electrodialysis process. A membrane is preferably manufactured from a polyethylene, and still more preferably from a low-density polyethylene. It is hereby possible to provide a membrane having a sufficient mechanical strength that it does not deform in the case of a hydraulic pressure difference such that the form of the channels in the membranes changes. Such a hydraulic pressure difference can for instance amount to 30 kPa. The static pressure must be absorbed by providing sufficient support. This support is realized by, among other pats, the intermediate walls and the ribs in for instance the inlet part.

The invention further relates to a cell for generating electricity on the basis of a reverse electrodialysis process, comprising at least two membranes as described above, wherein at least one membrane is an anion-exchanging membrane and at least one other membrane is a cation-exchanging membrane, wherein these membranes are placed alternately. Such a cell provides the same effects and advantages as those stated with reference to the membrane.

In an advantageous preferred embodiment two adjacent membranes lie against each other with an outer surface. This outer surface is the surface of the intermediate walls lying parallel to the main plane of the membrane. The desired flow according to invention is hereby realized.

The invention further relates to a device for performing a reverse electrodialysis process, comprising a number of cells as stated above, wherein at least one anode compartment is provided with an anode placed in an anode fluid comprising reagents for an oxidation reaction, and at least one cathode compartment separated from the at least one anode compartment and provided with a cathode placed in a cathode fluid comprising reagents for a reduction reaction. Such a device provides the same effects and advantages as those stated with reference to the cell and the membrane.

In an advantageous preferred embodiment of the device at least one feed channel and at least one discharge channel are provided for feed and discharge of the fluid in the channels.

The feed channels and manifolds are realized by arranging passages in the membranes. The flow speed in the channels provided in the membrane preferably amounts to about 3 to 6 cm/s. This quantity must be supplied from the feed channel to these channels in the membrane. In order to limit electrical short-circuit currents the throughflow openings of the feed channels and discharge channels must be as small as possible. Such short-circuit currents in the device reduce the efficiency of the reverse electrodialysis process.

In an advantageous preferred embodiment the number of cells in a device amounts to about 3000-3500, with preferably an overall dimension of 1.75×1.75×2.0 meters. Owing to this dimensioning a device, or a so-called stack, is such that the largest possible membrane area can be installed in a relatively limited space and wherein such a stack can be placed as optimally as possible in a 40-foot sea container, since six of such stacks can hereby be placed in a container. This makes handling of the device according to the invention considerably simpler and also makes it possible to assemble the whole installation at a desired location. In order to limit the space used by the inlet part and the outlet part relative to the actively used membrane part in the form of the channels, the use is recommended of many feed channels with a relatively small diameter and a small inlet part compared to known devices as used for instance in electrodialysis processes.

One feed channel is preferably provided about every 125 mm in the membrane. This enables the dimensions of the feed channels to remain limited. This enlarges the efficiently usable part of the membrane, thereby further increasing the overall efficiency of the process.

A feed channel is preferably provided with fluid from both outer ends in order to keep the flow speed in such feed channels as low as possible. The hereby realized, relatively low flow speeds result in a reduction in the pressure drop over the feed channel and additionally result in a better distribution of the flow over the individual cells.

In an advantageous preferred embodiment of the device adjacent cells are placed crosswise in order to enhance the stability of the device. Such a crosswise stacking increases the stability of the stack of membranes as a whole. Such a stacking per se has the consequence that the membranes should be provided with four equal side edges, at least in the case the flow of the individual fluids is the same. A possible drawback here relates to a greater risk of electrical short-circuit currents. This can however be obviated by a correct configuration of the feed channels and the relation thereof to the passages to the membranes.

The invention further relates to a method for manufacturing membranes as defined above. The channels in membranes can be realized by for instance injection moulding or cutting, rolling or pressing of the channels. The invention likewise relates to a method for generating electricity using a device for performing a reverse electrodialysis process as described above. These methods provide the same effects and advantages as those stated with reference to the membrane, the cell and the device.

Further advantages, features and details of the invention are elucidated on the basis of the preferred embodiments thereof, wherein reference is made to the accompanying drawings, in which.

Figure 1:
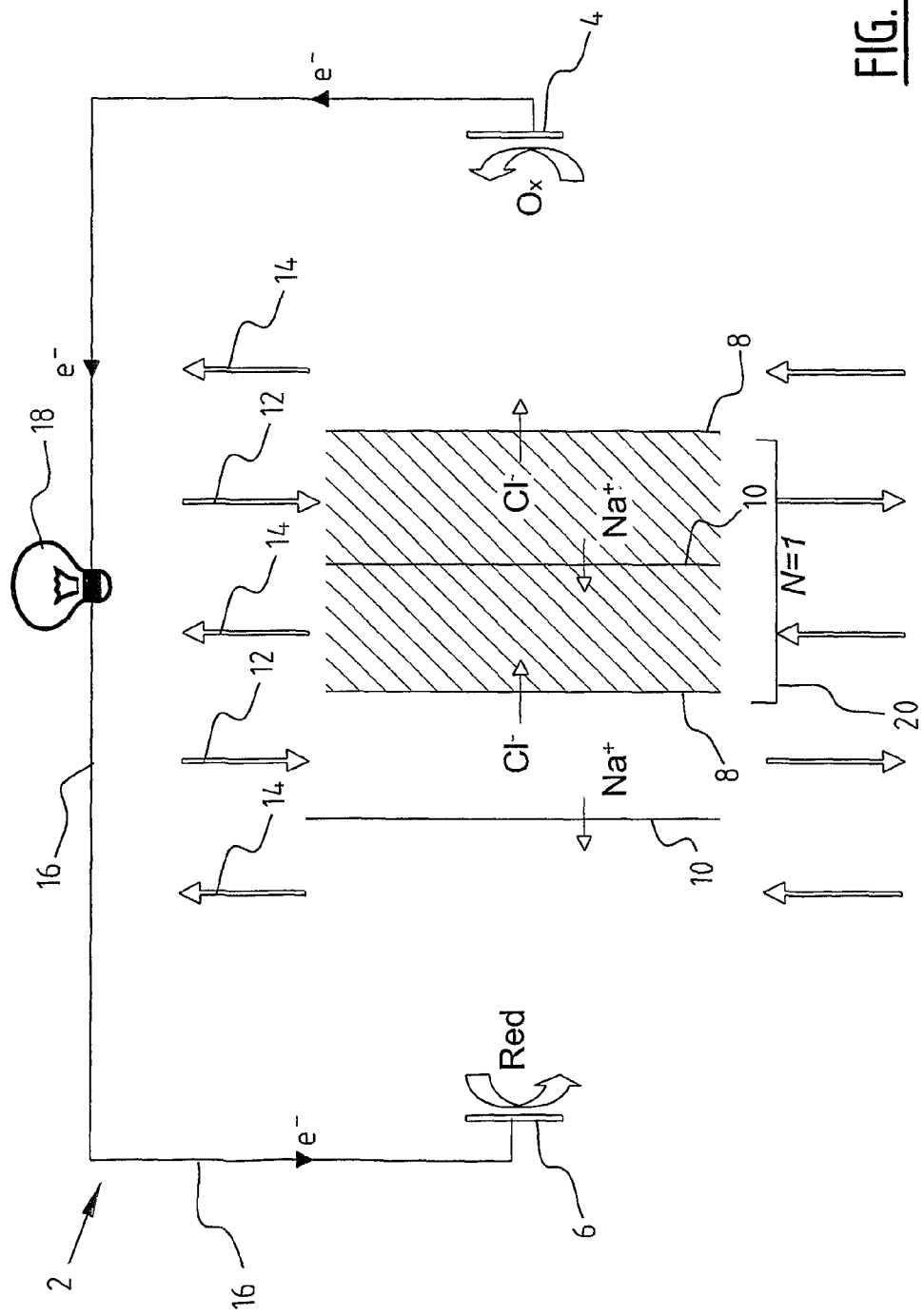
FIG. 1 shows a schematic outline of the operation of a prior art reverse electrodialysis process.

In a reverse electrodialysis process 2 (as shown schematically in FIG. 1) a number of anion exchange membranes 8 and cation exchange membranes 10 are placed between anode 4 and cathode 6. Electrolyte compartments are formed between anion exchange membranes 8 and cation exchange membranes 10, wherein a flow of seawater 12 and river water 14 flow alternately through adjacent compartments. Owing to the differences in concentration of ions in the flow of seawater 12 and river water 14, the ions in seawater 12 will want to move to river water 14 in order to equalize the concentrations. For the sake of convenience only sodium and chloride ions are shown as positive and negative ions in FIG. 1.

Since anion exchange membranes 8 only allow passage of anions and cation exchange membranes 10 only allow passage of cations, the transport of anions and cations will take place in opposite directions. The anions ($Cl^-$) here move in the direction of anode 4 and the cations ($Na^+$) move in the direction of cathode 6. In order to maintain electric neutrality an oxidation reaction takes place in the compartment in which anode 4 is placed and a reduction reaction takes place in the compartment in which cathode 6 is placed. An electron flow is hereby generated in electric circuit 16 to which anode 4 and cathode 6 are connected. In this electric circuit 16 electric work can be performed by an electrical apparatus 18, designated symbolically here by means of a light-bulb.

Shown with hatching in FIG. 1 is a dialytic cell 20 which consists of a membrane pair of an anion exchange membrane 8 and cation exchange membrane 10 and a mass of a solution with a high ion concentration, for instance seawater, and a solution with a low ion concentration, for instance river water. The number (N) of dialytic cells 20 can be increased in order to increase the potential difference between anode 4 and cathode 6.

A number of channels 34 are arranged in a membrane 32 (FIG. 2), for instance by cutting, rolling, pressing or injection moulding. Inlet parts 36 and outlet parts 38 are also provided in membrane 32 in the same manner as the channels. Each inlet part 36 is provided with a throughflow opening which, in combination with the other adjacent membranes, forms a feed channel for the fluid, i.e. the water. The outer dimensions of such a membrane 32 amount to for instance about 1920×1920 mm. A strip 80 mm wide is provided all around the edge of membrane 32. Inlet parts 36 and outlet parts 38 are provided in this edge. Holes 42 are also arranged in this edge for the purpose of positioning and fixing the membrane in a whole stack. Throughflow openings 44 for supply or discharge of liquid to other membranes are also provided on the side edges in which no inlet or outlet parts 36, 38 are arranged. A detail of the top view of membrane 32 (FIG. 3) shows channels 34, wherein in the shown embodiment the flow direction is from the bottom to the top. Opening 40 of the manifold is provided in inlet part 36 of membrane 32. In the shown embodiment this opening 40 has a diameter of 26 mm. The fixing holes 42 have a diameter of about 13 mm and the middle point is about 20 mm from the side edge of membrane 32. The distance from the middle point of feed opening 40 is about 48 mm from the edge of membrane 32. In the shown embodiment a number of channels 34 are supplied with a liquid from each inlet opening 40. For the sake of clarity six of the 104 channels 34 are illustrated in the shown embodiment. Eleven ribs 46 are here provided in inlet part 36 of membrane 32. In the shown embodiment these ribs 46 are placed in the line of intermediate wall 48 between channels 34 and the central axis of these channels 34. The width of these ribs 46 amounts to about 1 mm. The width of the 104 channels 34 supplied from one feed opening 40 amounts to about 125 mm.

Figure 2:
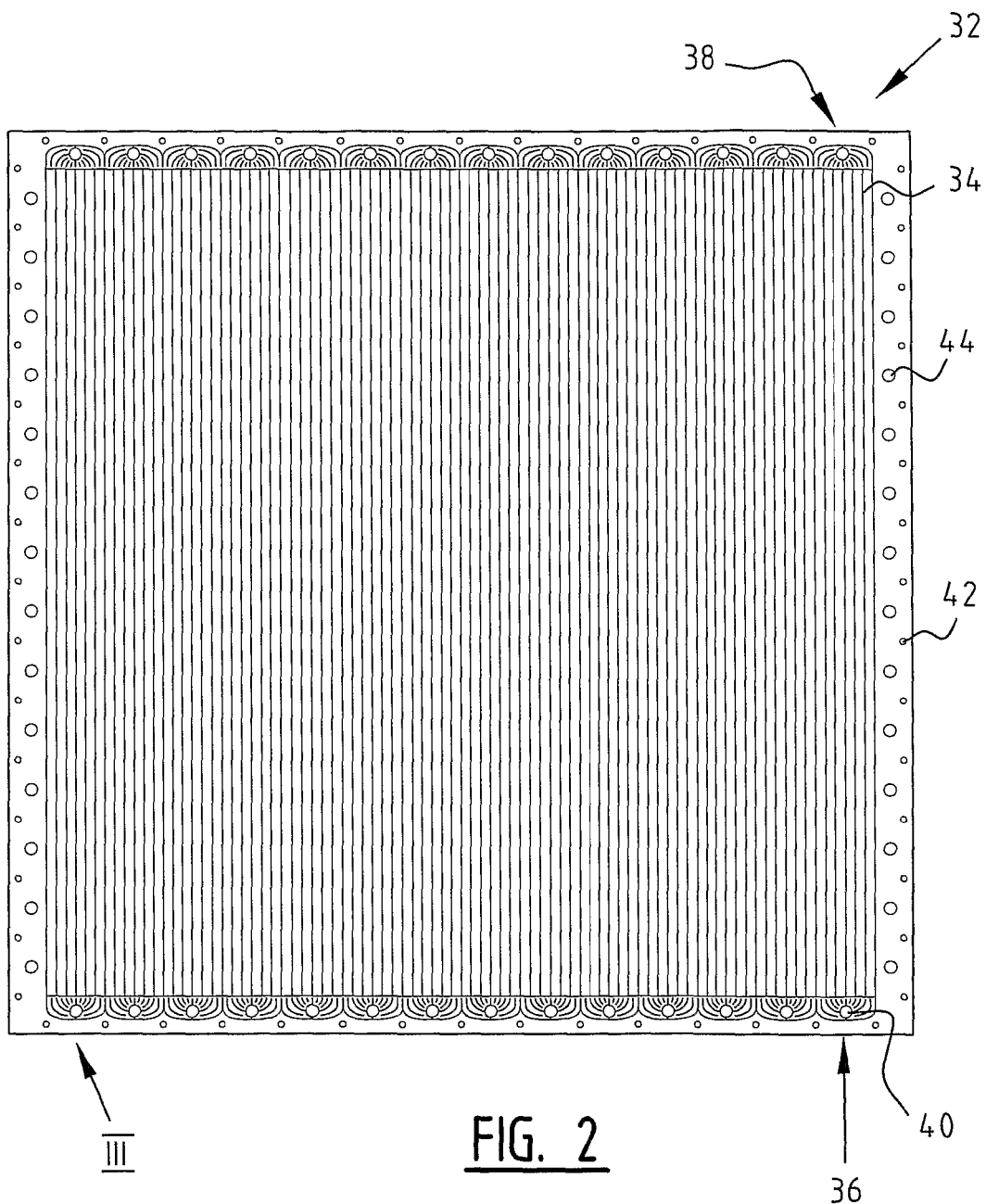
FIG. 2 shows a top view of a membrane according to the invention.
Figure 3:
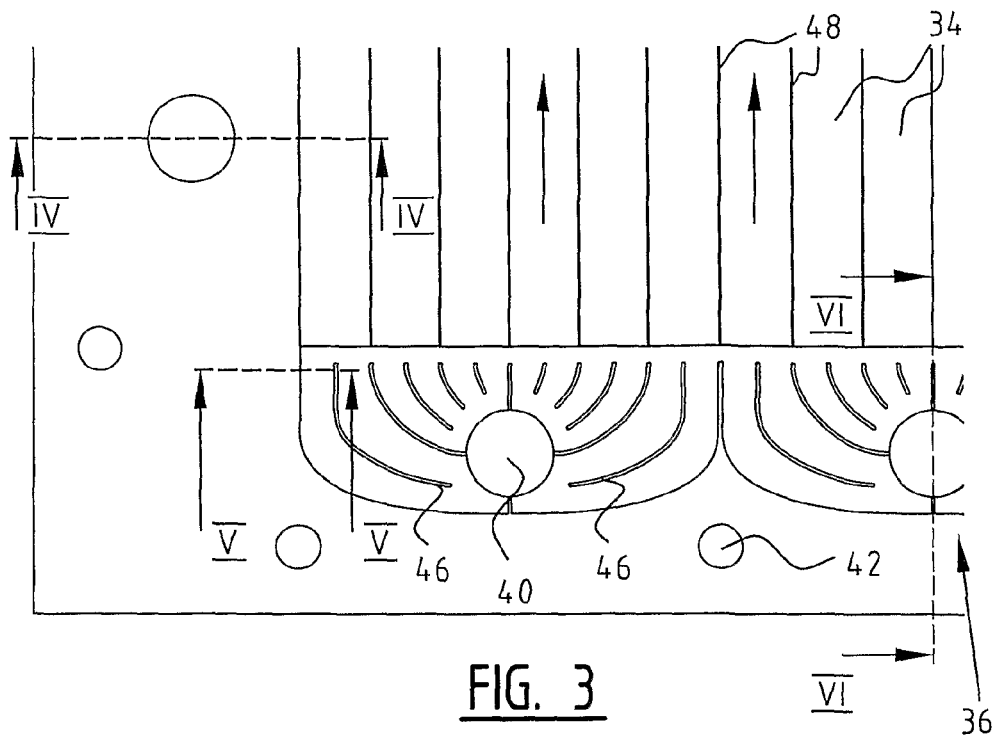
FIG. 3 shows an enlarged detail of the membrane of FIG. 2.
Figure 4:
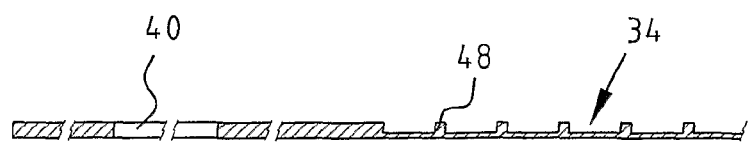
FIG. 4 shows a partial cross-section of the membrane according to the invention.

A partial cross-section along IV-IV (FIG. 4) shows the side view of a throughflow opening 40 provided in the side edge of the membrane 32 shown in FIG. 2. In the shown embodiment the thickness of membrane 32 is 0.3 mm. The width of channels 34 in membrane 32 amounts to 1 mm, wherein the width of intermediate walls 44 between adjacent channels 34 amounts to 0.2 mm. The depth of channels 34 amounts to 0.2 mm, so that the bottom of channel 34 has a thickness of 0.1 mm.

Figure 5:
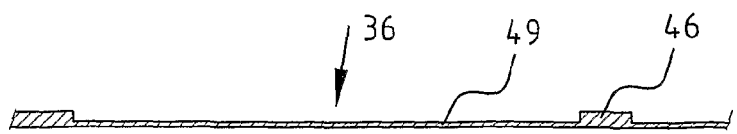
FIG. 5 shows a partial cross-section of an inlet part of a membrane according to the invention.

The width of outflow openings 49 between ribs 46 (FIG. 5 showing a cross-section along V-V in FIG. 3) amounts to about 10 mm, wherein the thickness of ribs 46 amounts to about 1 mm. The depth of channels 49 between ribs 46 amounts to about 0.2 mm, whereby the bottom between these flow spaces likewise amounts to 0.1 mm.

Figure 6:
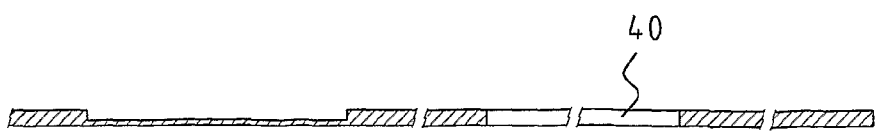
FIG. 6 shows a cross-section of the transition from the inlet part to the channels in the membrane according to the invention.

Another cross-section (FIG. 6 showing a cross-section along VI-VI in FIG. 3) is a side view in flow direction of the shown embodiment, wherein the width of ribs 46 lying parallel to the flow direction through channels 34 amounts to about 1 mm. In order to obtain a good distribution of a liquid over channels 34 there is an additional open space provided between the outer end of ribs 46 and the beginning of channels 34 of about 5 mm in length.

EXAMPLE

Calculation of Possible Configuration of a Membrane According to the Invention

Use is made for dimensioning purposes of dimensions as shown in the discussed embodiment. The packing density can be calculated with this dimensioning of the membranes and the crosswise stacking. Depending on the production method, this packing density can vary from 2,300 $m^2/m^3$ to 4,400 $m^2/m^3$. If for instance the supports are not functionalized at all, they are then regarded as insulator or "shadow" with an effect comparable to that of a spacer. In another case where all material is functionalized, the packing density can increase to 4,400 $m^2/m^3$. The walls of the channels will then also function as membrane. The calculation hereof is as follows:

| | $a = \frac{eff \cdot \text{membrane surf.}}{\text{installed surf.}}$ (m²/m³) | packing-density (m²/m³) |
|---|---|---|
| 'shadow' | $\frac{x_1^2}{(x_1+x_2)^2} = 0.69$ | $p = \frac{a}{(h+d)} = 2{,}300$ |
| 'no shadow' | 1.0 | $p = 3{,}300$ |
| projected surface + 'shadow' | $\frac{x_1^2 + 2x_1 h}{(x_1+x_2)^2} = 0.97$ | $p = 3{,}200$ |
| projected surface 'no shadow' | $\frac{(x_1+x_2)^2 + 2(x_1+x_2)h}{(x_1+x_2)^2} = 1.33$ | $p = 4{,}400$ | wherein $x_1$ is the channel width, $x_2$ is the thickness of the intermediate walls, h is the channel depth, d is the remaining membrane thickness (of the channel bottom).

For the calculations of the residence time use is made of a=0.83 (a value at which no account is taken of the shadow of the subsequent membrane but only of the shadow of the individual membrane) and therefore a packing density of the membranes of 2,700 m²/m³.

It is further possible to determine the volume distribution:

Membranes:sea:river=$2 \cdot (d \cdot (x_1+x_2)+h \cdot x_2): h \cdot x_1 : h \cdot x_1$ Under optimum conditions the installation is operated at a voltage amounting to 50-75% of the open stack voltage. More or less useful work is performed by the system in accordance with this percentage. At 50% operation of the open stack voltage a maximum of 50% of the available energy is converted into useful work, although then at high power. At 75% operation of the open stack voltage a maximum of 75% of the available energy is converted into useful work, although rather less high power is then achieved. For the 40-foot sea container with six stacks the volume of the membrane stack is 36.75 m³. It can be calculated herefrom that the residence time amounts to 30-60 seconds. At a channel length of 1.75 meters the flow speed through the stack amounts to about 3 to 6 cm/s. For the following pressure drop calculations use is made of 3 cm/s.

The set requirement for the overall pressure drop over the stack is that this may amount to a maximum of 35 kPa, and that furthermore the pressure drop is achieved for the greater part over the channels. The design illustrated in the shown embodiment meets this requirement:

Channels

Pressure drop calculations confirm that at a linear flow speed of 3 cm/s the pressure drop over the channels can be limited to less than 25 kPa.

Manifolds

The water distribution takes place using passages in the membranes, so-called manifolds. The manifolds are connected to the channels by means of openings or headers. The use of many manifolds with small diameter and small header or inlet parts has been chosen for the water distribution, since the space used by the headers remains small compared to the active membrane part (the channels) and the pressure drop over the header moreover also remains limited. Provided along a length of 1750 mm are 14 manifolds (one manifold per 125 mm) and headers, onto each of which 104 channels are connected. The diameter of each manifold is 25.7 mm (circumference 80 mm, wherein the manifolds lie clear of the edge; area 518 mm²). This dimensioning is chosen on the one hand to limit the pressure drop over the manifold and on the other to limit the outflow and inflow speed per membrane.

Pressure drop manifold: A manifold provides in the tested embodiment for the supply of drainage of 3333 cell pairs, wherein each cell pair extracts or adds 0.62 ml/s (flow rate through 104 channels). Using such a stack the maximum flow rate in a manifold is therefore about 2 l/s, which would result in flow speeds of 4 m/s. This would result locally in enormous pressure drops, and as a result also to poor distribution of the water flows over the cell pairs. A choice has therefore been made for a two-sided flow into and out of the manifolds. The maximum speed then amounts to 2 m/s on the outermost sides of the stack and 0 m/s in the middle of the stack. It has been calculated for this design that as a result the pressure drop over the manifold varies such that a water distribution results which is still reasonably uniform (+/−7%, so 0.62+/−0.04 ml/s. The pressure drop over the manifolds is relatively small (average 12% of the pump power required for throughflow of the stack is used by the manifolds).

Outflow and inflow speed: The average speed out of or to the manifold amounts to 3.8 cm/s. Calculations show that 70% of the outflow takes place over half the circular arc of the manifold on the side of the membranes, the other half thus contributing another 30%.

Headers

The manifolds are connected to the channels by means of the headers. These headers would of themselves have insufficient mechanical strength. Twelve fins (ribs) are however incorporated in the headers as support points which are placed parallel to the flow paths or channels. The pressure drop over the headers with these fins amounts according to calculations to 0.5 kPa, a fraction of the 25 kPa over the channels. The placing of the ribs is such that the same flow rate is achieved between each rib.

Length/Width Ratio

In the proposed membranes with four equal sides interruptions can be made every 104 channels (or a multiple thereof). The length/width ratio thereby becomes 14:1.

The present invention is by no means limited to the above described preferred embodiments. The rights sought are defined by the following claims, within the scope of which many modifications are possible. It will for instance also be possible to apply the membrane according to the present invention in electrodialysis processes. In addition to a single profiled membrane surface with which channels are provided, another possibility is for instance to provide the other side of the membrane with such channels. Depending on, among other factors, the materials used and the desired dimensions of the membrane, the number of channels, the form and the number of ribs in the inlet part can for instance be varied in order to thereby obtain the best possible flow conditions.

The invention claimed is:

1. A cell for performing a reverse electrodialysis process with a laminar flow, the cell comprising:
    at least two membranes, wherein each membrane comprises a number of straight parallel channels arranged on at least a first side of the membrane, wherein each straight channel extends linearly from an inlet part at a first end of the membrane to an outlet part at a second end of the membrane which is opposite the first end, and wherein the channels are suitable for throughfeed of a fluid and are configured to direct fluid along a fluid flow direction extending from the first to the second end of the membrane and to provide a laminar flow of the fluid through the channels, wherein the fluid flow direction is parallel to each straight channel,
    wherein at least one membrane is an anion-exchanging membrane and at least one other membrane is a cation-exchanging membrane, wherein the at least one anion-exchanging membrane and the at least one cation-exchanging membrane are placed alternately, and lie against each other at an outer surface.

2. The device as claimed in claim 1, wherein each inlet part is along an edge of the membrane at the first end of the membrane and each outlet part is along an opposite edge of the membrane at the second end of the membrane.

3. The device as claimed in claim 1, wherein each channel of a membrane is parallel to an edge of the membrane.

4. The device as claimed in claim 1, wherein each channel has a length and the length of each channel is equal to that of the other channels.

5. The device as claimed in claim 1, wherein each membrane has a top side and a bottom side and wherein each inlet part comprises an opening for feeding fluid flowing therethrough from the top side to the bottom side or from the bottom side to the top side.

6. The device as claimed in claim 1, wherein each membrane comprises a first edge, a second edge, a third edge and a fourth edge, and wherein the first edge is at the first end of the membrane and the second edge is at the second end of the membrane, and wherein the third edge is adjacent to the first and second edges and is opposite the fourth edge, and wherein the third and fourth edges do not include inlet parts or outlet parts.

7. A device for performing a reverse electrodialysis process, the device comprising:
at least one cell as claimed in claim 1;
at least one anode compartment provided with an anode placed in an anode fluid comprising reagents for an oxidation reaction;
at least one cathode compartment separated from the at least one anode compartment by the at least one cell and provided with a cathode placed in a cathode fluid comprising reagents for a reduction reaction.

8. The device as claimed in claim 7, wherein the device is configured such that flow speed of the fluid in the channels ranges from about 3 to 6 cm/s.

9. The device as claimed in claim 7, wherein at least one feed channel and at least one discharge channel are provided for feed and discharge of the fluid in the number of channels.

10. The device as claimed in claim 9, wherein the at least one feed channel supplies fluid to 104 of the channels with a combined width of about 125 mm.

11. The device as claimed in claim 9, wherein the at least one feed channel for fluid comprises an inlet at both outer ends of a manifold in order to limit the flow speed.

12. The device as claimed in claim 7, wherein the device comprises 3,000-3,500 cells.

13. The device as claimed in claim 12, wherein the device has an overall dimension of 1.75×1.75×2.0 m.

14. The device as claimed in claim 7, wherein adjacent cells are placed crosswise in a perpendicular orientation with respect to one another in order to enhance the stability of the device.

* * * * *